US012704482B2

(12) United States Patent
Coleman et al.

(10) Patent No.: US 12,704,482 B2
(45) Date of Patent: Aug. 11, 2026

(54) RESONANCE INSPECTION SYSTEM AND METHOD FOR USING SAME

(71) Applicant: RTX Corporation, Farmington, CT (US)

(72) Inventors: Ronald B. Coleman, Arlington, MA (US); Alan R. Curtis, Acton, MA (US)

(73) Assignee: RTX Corporation, Farmington, CT (US)

( * ) Notice: Subject to any disclaimer, the term of this patent is extended or adjusted under 35 U.S.C. 154(b) by 282 days.

(21) Appl. No.: 18/658,891

(22) Filed: May 8, 2024

(65) Prior Publication Data

US 2025/0362271 A1 Nov. 27, 2025

(51) Int. Cl.
*G01N 29/12* (2006.01)
*G01N 29/04* (2006.01)
(Continued)

(52) U.S. Cl.
CPC .......... *G01N 29/12* (2013.01); *G01N 29/041* (2013.01); *G01N 29/2437* (2013.01); *G01N 29/4427* (2013.01); *G01N 29/4454* (2013.01); *G01N 2291/014* (2013.01); *G01N 2291/2694* (2013.01)

(58) Field of Classification Search
CPC .. G01N 29/12; G01N 29/041; G01N 29/2437; G01N 29/4427; G01N 29/4454; G01N 2291/014; G01N 2291/2694; G01N 29/4436; G01N 29/46
See application file for complete search history.

(56) References Cited

U.S. PATENT DOCUMENTS 4,290,017 A 9/1981 Fortunko
9,372,176 B2 6/2016 Escobar-Ruiz
(Continued)

FOREIGN PATENT DOCUMENTS

CN 116773128 A 9/2023
WO WO-2018156612 A1 * 8/2018 ............ G01N 29/46

OTHER PUBLICATIONS

EP Search Report for EP Patent Application No. 25175189.7 dated Sep. 22, 2025.

*Primary Examiner* — Thomas M Hammond, III
(74) *Attorney, Agent, or Firm* — Getz Balich LLC

(57) ABSTRACT

A resonance inspection system a processing system configured to process resonance data including a vibratory response signature of a component over a portion of a frequency range of the vibratory response signature to generate a plurality of different resonance spectra waveforms of the vibratory response signature. The plurality of different resonance spectra waveforms includes a first resonance spectra waveform and a second resonance spectra waveform. The processing system is further configured to detrend the first resonance spectra waveform and the second resonance spectra waveform and identify a presence or an absence of a structural mode of the component using the first resonance spectra waveform and the second resonance spectra waveform. The presence of the structural mode is identified by determining the first resonance spectra waveform includes a maximum slope point at a first frequency of the portion of the frequency range and the second resonance spectra waveform includes a second peak at a second frequency of the portion of the frequency range.

20 Claims, 12 Drawing Sheets

(51) Int. Cl.

| | |
|---|---|
| ***G01N 29/24*** | (2006.01) |
| ***G01N 29/44*** | (2006.01) |

(56) References Cited

U.S. PATENT DOCUMENTS

| | | | | |
|---|---|---|---|---|
| 11,928,811 | B2 | 3/2024 | Surana | |
| 2014/0060188 | A1 * | 3/2014 | Singh | G01N 29/12 73/579 |
| 2014/0074410 | A1 | 3/2014 | Glavicic | |
| 2018/0313769 | A1 * | 11/2018 | Hunter | G01N 29/4472 |
| 2019/0212302 | A1 | 7/2019 | Jauriqui | |
| 2024/0027401 | A1 * | 1/2024 | Mcbrayer | G01N 29/07 |
| 2025/0314620 | A1 * | 10/2025 | Chen | G01N 29/36 |

* cited by examiner

RESONANCE INSPECTION SYSTEM AND METHOD FOR USING SAME

BACKGROUND

1. Technical Field

This disclosure relates generally to the inspection of aircraft propulsion system components using non-destructive testing techniques and, more particularly, to resonance-based component inspection.

2. Background Information

Various systems and methods are known in the art for inspecting a component for internal defects. While these known inspection systems and methods have various benefits, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a resonance inspection system includes a control assembly. The control assembly includes a processing system. The processing system includes a processor in communication with a non-transitory memory storing instructions, which instructions when executed by the processor, cause the processor to process resonance data including a vibratory response signature of a component over a portion of a frequency range of the vibratory response signature to generate a plurality of different resonance spectra waveforms of the vibratory response signature. The plurality of different resonance spectra waveforms includes a first resonance spectra waveform and a second resonance spectra waveform. The first resonance spectra waveform is different than the second resonance spectra waveform. The instructions, when executed by the processor, further cause the processor to detrend the first resonance spectra waveform and the second resonance spectra waveform and identify a presence or an absence of a structural mode of the component using the first resonance spectra waveform and the second resonance spectra waveform. The presence of the structural mode is identified by determining the first resonance spectra waveform includes a maximum slope point at a first frequency of the portion of the frequency range and the second resonance spectra waveform includes a second peak at a second frequency of the portion of the frequency range. The first frequency and the second frequency are within a predetermined frequency range threshold.

In any of the aspects or embodiments described above and herein, the instructions, when executed by the processor, may further cause the processor to differentiate the first resonance spectra waveform such that the maximum slope point is characterized by a first peak at the first frequency. Determining the first resonance spectra waveform may include the maximum slope point at the first frequency includes determining the first resonance spectra waveform includes the first peak at the first frequency.

In any of the aspects or embodiments described above and herein, the first resonance spectra waveform may be a magnitude spectra part of the vibratory response signature and the second resonance spectra waveform may be a phase spectra part of the vibratory response signature.

In any of the aspects or embodiments described above and herein, the first resonance spectra waveform may be a real spectra part of the vibratory response signature and the second resonance spectra waveform may be an imaginary spectra part of the vibratory response signature.

In any of the aspects or embodiments described above and herein, the absence of the structural mode may be identified by determining and the first frequency and the second frequency are outside a predetermined frequency range threshold.

In any of the aspects or embodiments described above and herein, the instructions, when executed by the processor, may further cause the processor to identify a defect condition is present for the component by identifying the absence of the structural mode within a frequency range corresponding to a known structural mode of a model component.

In any of the aspects or embodiments described above and herein, the instructions, when executed by the processor, may further cause the processor to detrend the first resonance spectra waveform and the second resonance spectra waveform using one or both of a cepstral detrending technique or a polynomial detrending technique.

In any of the aspects or embodiments described above and herein, the resonance inspection system may further include a probe assembly including a probe. The probe may include at least one piezoelectric transducer electrically connected with the control assembly. The instructions, when executed by the processor, may further cause the processor to control the at least one piezoelectric transducer to apply a vibration to the component and measure the vibratory response signature of the component with the at least one piezoelectric transducer.

In any of the aspects or embodiments described above and herein, the probe may extend along a probe axis. The at least one piezoelectric transducer may include a sense piezo and a drive piezo. The sense piezo and the drive piezo may form a double-stacked piezo configuration of the at least one piezoelectric transducer with the sense piezo and the drive piezo disposed on the probe axis.

According to another aspect of the present disclosure, a method for identifying a presence or an absence of a structural mode of a component for an aircraft propulsion system with a resonance inspection system is provided. The method includes inserting a probe assembly of the resonance inspection system into the aircraft propulsion system to position a probe of the probe assembly contacting the component at a single point-of-contact. The probe includes at least one piezoelectric transducer including a sense piezo and a drive piezo. The method further includes controlling the drive piezo, with a control assembly of the resonance inspection system, to apply a vibration to the component, measuring a vibratory response signature of the component with the sense piezo, and generating, with the control assembly, a plurality of different resonance spectra waveforms for a portion of a frequency range of the vibratory response signature. The plurality of different resonance spectra waveforms includes a first resonance spectra waveform and a second resonance spectra waveform. The first resonance spectra waveform is different than the second resonance spectra waveform. The method further includes detrending, with the control assembly, the first resonance spectra waveform and the second resonance spectra waveform and identifying a presence or an absence of a structural mode of the component using the first resonance spectra waveform and the second resonance spectra waveform. The presence of the structural mode is identified by determining the first resonance spectra waveform includes a maximum slope point at a first frequency of the portion of the frequency range and the second resonance spectra waveform includes a second peak at a second frequency of the portion of the frequency range. The first frequency and the second frequency are within a predetermined frequency range threshold.

In any of the aspects or embodiments described above and herein, the steps of inserting the probe assembly into the aircraft propulsion system, controlling the drive piezo to apply a vibration to the component, and measuring the vibratory response signature of the component with the sense piezo may be performed with the aircraft propulsion system installed on an aircraft.

In any of the aspects or embodiments described above and herein, the component may be a gas turbine engine rotor disk of the aircraft propulsion system.

In any of the aspects or embodiments described above and herein, the first resonance spectra waveform may be a magnitude spectra part of the vibratory response signature and the second resonance spectra waveform may be a phase spectra part of the vibratory response signature.

In any of the aspects or embodiments described above and herein, the first resonance spectra waveform may be a real spectra part of the vibratory response signature and the second resonance spectra waveform may be an imaginary spectra part of the vibratory response signature.

In any of the aspects or embodiments described above and herein, the absence of the structural mode may be identified by determining the first frequency and the second frequency are outside a predetermined frequency range threshold.

In any of the aspects or embodiments described above and herein, the method may further include identifying, with the control assembly, a defect condition is present for the component by identifying the absence of the structural mode within a frequency range corresponding to a known structural mode of a model component.

In any of the aspects or embodiments described above and herein, the method may further include identifying, with the control assembly, a defect condition is present for the component by identifying the absence one or both of the maximum slope point or the second peak within a frequency range corresponding to a known structural mode of a model component.

In any of the aspects or embodiments described above and herein, the probe may extend along a probe axis. The sense piezo and the drive piezo may form a double-stacked piezo configuration of the at least one piezoelectric transducer with the sense piezo and the drive piezo disposed on the probe axis.

In any of the aspects or embodiments described above and herein, the probe may further include a tip member disposed at the sense piezo. The tip member may form the single point-of-contact between the probe and the component.

In any of the aspects or embodiments described above and herein, the method may further include differentiating the first resonance spectra waveform such that the maximum slope point is characterized by a first peak at the first frequency. Determining the first resonance spectra waveform includes the maximum slope point at the first frequency may include determining the first resonance spectra waveform includes the first peak at the first frequency.

The present disclosure, and all its aspects, embodiments and advantages associated therewith will become more readily apparent in view of the detailed description provided below, including the accompanying drawings.

DETAILED DESCRIPTION

Figure 1:
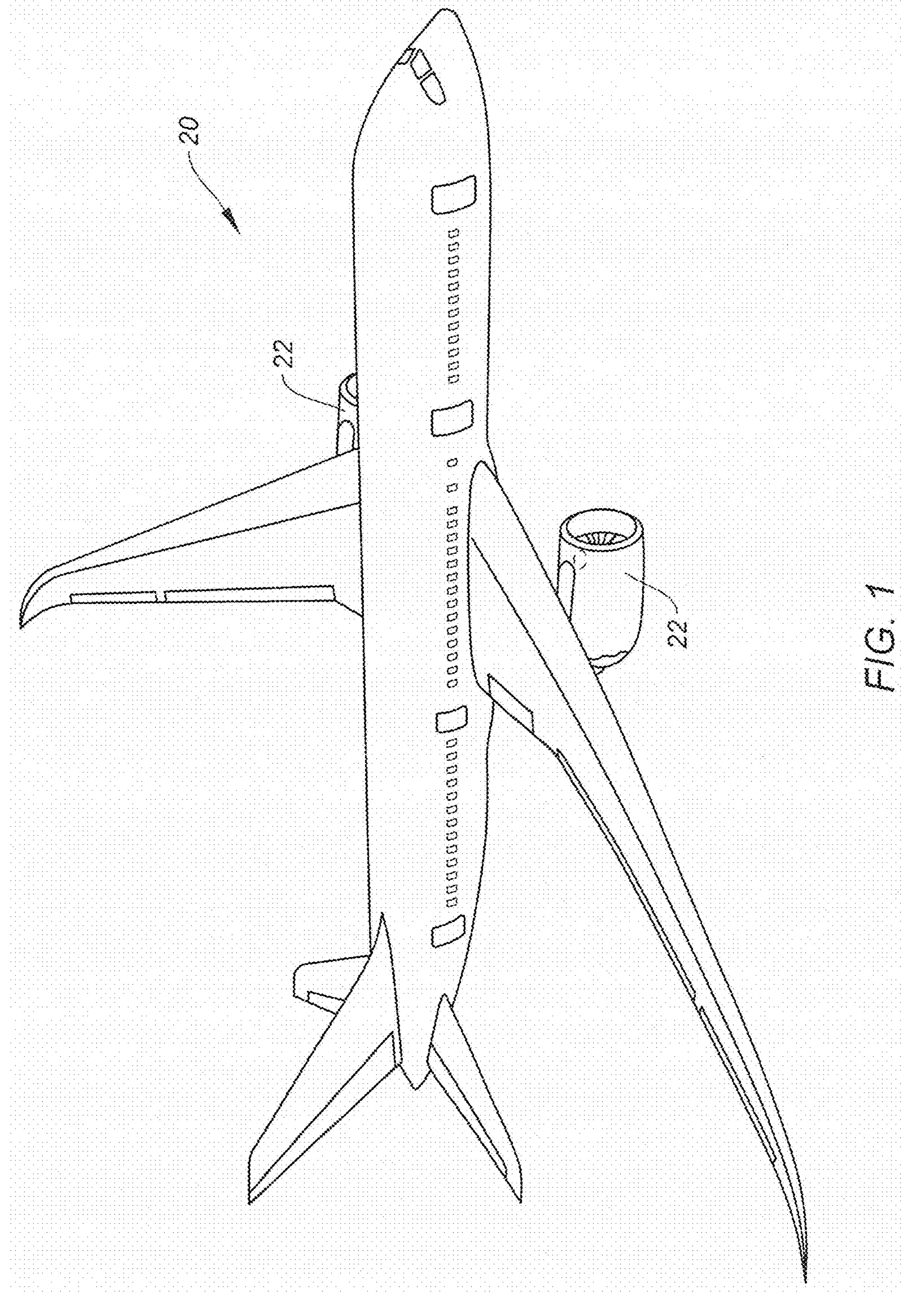
FIG. 1 illustrates a perspective view of an aircraft including a propulsion system, in accordance with one or more embodiments of the present disclosure.
Figure 2:
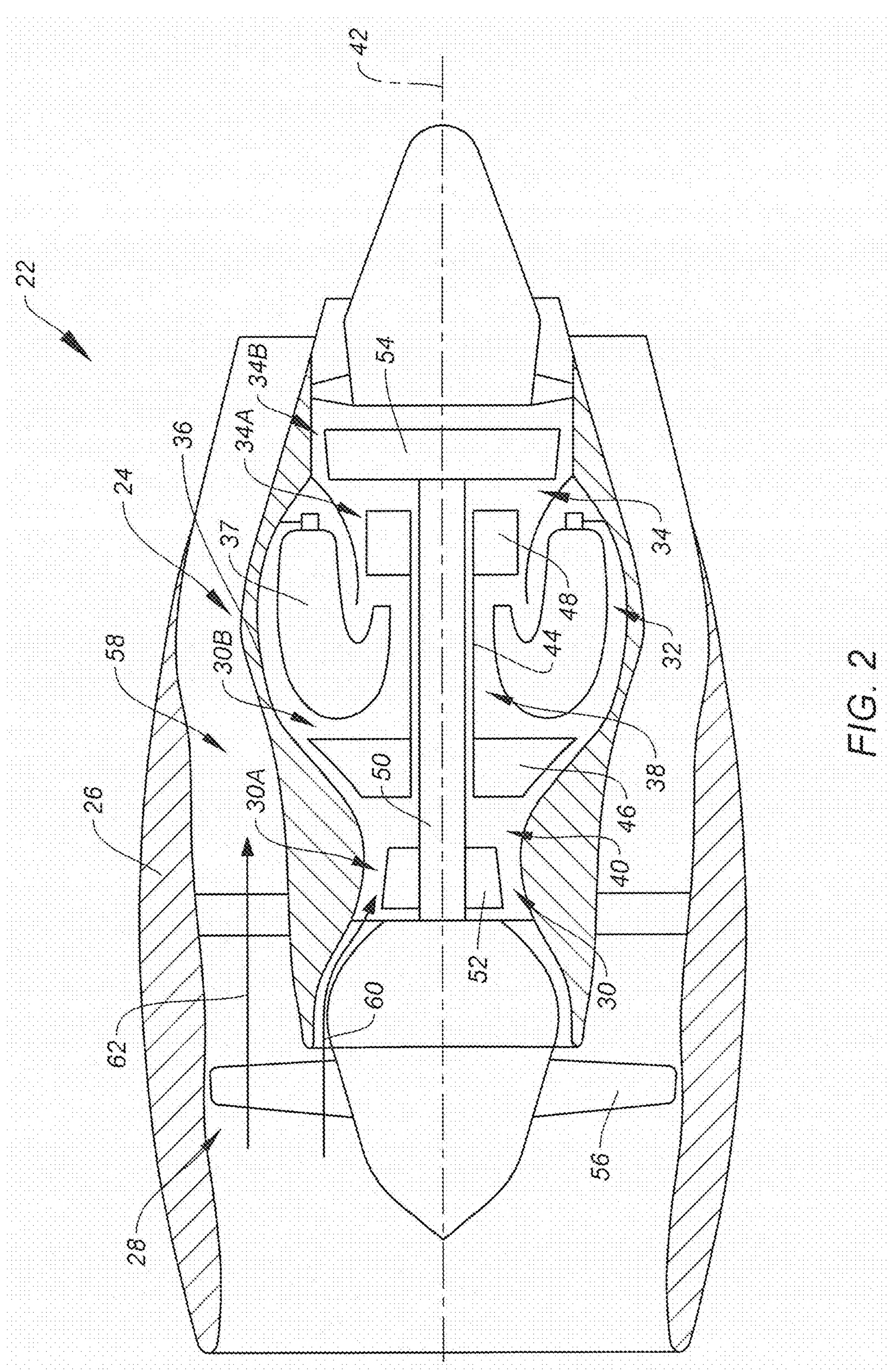
FIG. 2 schematically illustrates a cutaway, side view of an aircraft propulsion system including a gas turbine engine, in accordance with one or more embodiments of the present disclosure.

FIG. 1 illustrates an aircraft 20 including a propulsion system 22. Briefly, the aircraft 20 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft 20 may be a manned aerial vehicle or an unmanned aerial vehicle (UAV, e.g., a drone). FIG. 2 schematically illustrates a cutaway, side view of the propulsion system 22. The propulsion system 22 of FIG. 2 includes a gas turbine engine 24 and a nacelle 26.

The gas turbine engine 24 of FIG. 2 is configured as a multi-spool turbofan gas turbine engine 24. However, while the following description and accompanying drawings may refer to the turbofan gas turbine engine 24 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 24 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 37 (e.g., an annular combustor). The turbine section 34 includes a high-pressure turbine (HPT) 34A and a low-pressure turbine (LPT) 34B.

Components of the fan section 28, the compressor section 30, and the turbine section 34 form a first rotational assembly 38 (e.g., a high-pressure spool) and a second rotational assembly 40 (e.g., a low-pressure spool) of the gas turbine engine 24. The first rotational assembly 38 and the second rotational assembly 40 are mounted for rotation about a rotational axis 42 (e.g., an axial centerline) of the gas turbine engine 24 relative to the engine static structure 36.

The first rotational assembly 38 includes a first shaft 44, a bladed first compressor rotor 46 for the high-pressure compressor 30B, and a bladed first turbine rotor 48 for the high-pressure turbine 34A. The first shaft 44 interconnects the bladed first compressor rotor 46 and the bladed first turbine rotor 48.

The second rotational assembly 40 includes a second shaft 50, a bladed second compressor rotor 52 for the low-pressure compressor 30A, a bladed second turbine rotor 54 for the low-pressure turbine 34B, and a bladed fan rotor 56 for the fan section 28. The second shaft 50 interconnects the bladed second compressor rotor 52 and the bladed second turbine rotor 54. The second shaft 50 may additionally interconnect the bladed fan rotor 56 with the bladed second compressor rotor 52 and the bladed second turbine rotor 54. Alternatively, the second shaft 50 may be coupled with the bladed fan rotor 56 by a gear assembly (e.g., a reduction gear box (RGB)). The first shaft 44 and the second shaft 50 are concentric and configured to rotate about the rotational axis 42. The present disclosure, however, is not limited to concentric configurations of the first shaft 44 and the second shaft 50.

The engine static structure 36 may include one or more engine cases, cowlings, bearing assemblies, inner fixed structures, and/or other non-rotating structures configured to house and/or support (e.g., rotationally support) components of the gas turbine engine sections 28, 30, 32, 34. The engine static structure 36 may form an exterior (e.g., an outer radial portion) of the gas turbine engine 24.

The nacelle is configured to house and provide an aerodynamic cover for the gas turbine engine 24. The nacelle may extend circumferentially about (e.g., completely around) the gas turbine engine 24 and its rotational axis 42. The nacelle may circumscribe and form an annular bypass duct 58 through the propulsion system 22. For example, the bypass duct 58 may be formed by and between (e.g., radially between) the gas turbine engine 24 (e.g., the engine static structure 36) and the nacelle.

In operation of the gas turbine engine 24, ambient air is directed through the fan section 28 and into a core flow path 60 (e.g., an annular flow path) and a bypass flow path 62 (e.g., an annular flow path) by rotation of the bladed fan rotor 56. Air flow along the core flow path 60 is compressed by the low-pressure compressor 30A and the high-pressure compressor 30B, mixed and burned with fuel in the combustor, and then directed through the high-pressure turbine 34A and the low-pressure turbine 34B. The bladed first turbine rotor 48 and the bladed second turbine rotor 54 rotationally drive the first rotational assembly 38 and the second rotational assembly 40, respectively, in response to the combustion gas flow through the high-pressure turbine 34A and the low-pressure turbine 34B. Air flow along the bypass flow path 62 is directed through the bypass duct 58.

Figure 3:
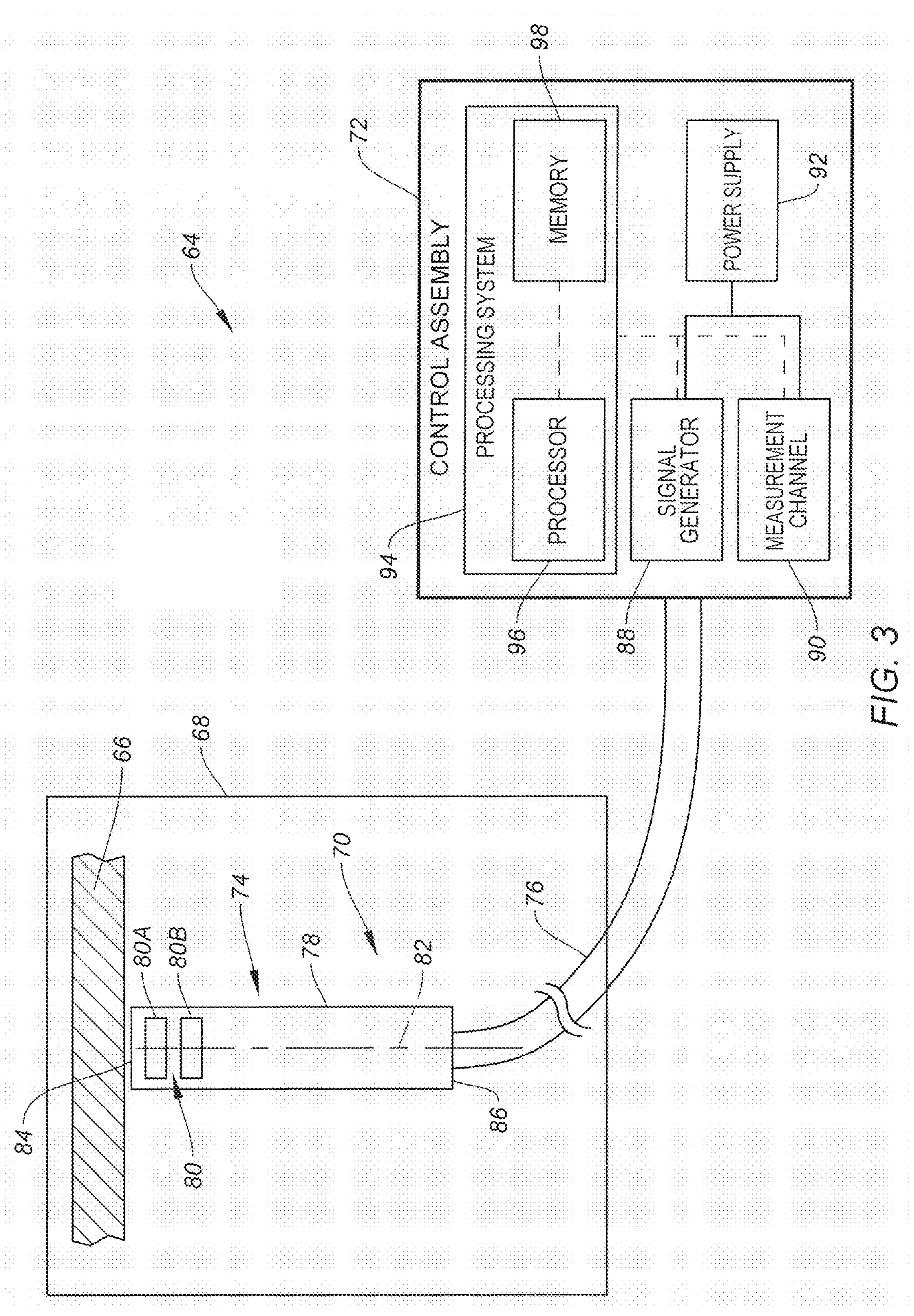
FIG. 3 schematically illustrates an inspection system for an aircraft propulsion system, in accordance with one or more embodiments of the present disclosure.

FIG. 3 schematically illustrates an inspection system 64 for inspecting a component 66 of an aircraft propulsion system 68 such as, but not limited to, the propulsion system 22 of FIGS. 1 and 2. The inspection system 64 may be configured to facilitate inspection of the component 66 while the component 66 remains installed with the propulsion system 68 on the aircraft 20 (e.g., the propulsion system 68 remains installed on wing, on fuselage, in airframe, etc.). The component 66, for example, may be disposed within an interior (e.g., an enclosed volume, an encased volume, etc.) of the propulsion system 68. Inspection of the component 66 may also be performed using the inspection system 64 while outside of an aircraft hangar and/or a dedicated inspection and/or repair facility (e.g., on a tarmac at an airport between aircraft flights). Inspection of the component 66 may thereby be performed with a relatively short aircraft downtime and/or a relatively minimal expense. The inspection system 64, of course, may also be used for inspecting the component 66 installed with the propulsion system 68 when that propulsion system 68 is not installed with the aircraft 20 (e.g., prior to installation with the aircraft 20 or following removal from the aircraft 20) or with the component 66 removed from the propulsion system 68. Inspection of the component 66 using the inspection system 64 may facilitate identification of one or more internal defects of the component such as cracks, voids, etc. (e.g., embedded within material of) the component 66. The term "defect," as used herein, shall refer to a physical anomaly present within a component (e.g., the component 66) which negatively affects the useful life or performance of the component.

The component 66 may be any inspectable (e.g., metal) component 66 within the propulsion system 68. However, for ease of description, the component 66 may be described below as a rotor disk of a bladed rotor of a gas turbine engine such as, but not limited to, the gas turbine engine 24 of FIG. 2. The rotor disk may be a turbine disk such as a rotor disk in a high-pressure turbine (HPT) or a low-pressure turbine (LPT) of a gas turbine engine. Alternatively, the rotor disk may be a compressor disk such as a rotor disk in a low-pressure compressor (LPC) or a high-pressure compressor (HPC) of a gas turbine engine. The present disclosure, however, is not limited to such exemplary component 66 configurations. The component 66, for example, may alternatively be configured as a hub, a shaft or any rotating component within the propulsion system 68.

The inspection system 64 of FIG. 3 is configured as an ultrasonic testing (UT) system. For example, the inspection system 64 may be configured for ultrasonic testing, process compensated resonance testing (PCRT), and/or other non-destructive testing (NDT) techniques involving application of ultrasonic vibration to a test object (e.g., the component 66). The inspection system 64 of FIG. 3 includes a probe assembly 70 and a control assembly 72.

The probe assembly 70 may be a borescope probe assembly configured for insertion into the propulsion system 68 for inspection of the component 66. However, the probe assembly 70 of the present disclosure is not limited to borescope probe assembly configurations. The probe assembly 70 of FIG. 3, for example, includes a probe 74 and a guide tube 76.

The probe 74 includes a probe housing 78 and one or more piezoelectric transducers 80. The probe housing 78 extends along a longitudinal axis 82 of the probe 74 between and to a distal end 84 of the probe housing 78 and a proximate end 86 of the probe housing 78. The piezoelectric transducers 80 of FIG. 3 are disposed within the probe housing 78 at (e.g., on, adjacent, or proximate) the distal end 84. The piezoelectric transducers 80 of FIG. 3 include a sense piezoelectric transducer 80A (a "sense piezo") and a drive piezoelectric transducer 80B (a "drive piezo"). The sense piezo 80A and the drive piezo 80B are disposed on the longitudinal axis 82 in an axially stacked (e.g., double-stacked) piezo configuration. For example, the sense piezo 80A is disposed at (e.g., on, adjacent, or proximate) the distal end 84 and the drive piezo 80B is disposed at (e.g., on, adjacent, or proximate) the sense piezo 80A and axially between the sense piezo 80A and the proximate end 86. The present disclosure, however, is not limited to the foregoing exemplary configurations of the piezoelectric transducers 80. For example, the sense piezo 80A and the drive piezo 80B may alternatively be axially coincident relative to the longitudinal axis 82 in a single-stack piezo configuration. The guide tube 76 is connected to the probe 74 at (e.g., on, adjacent, or proximate) the proximate end 86. The guide tube 76 may extend all or a substantial portion of a distance from the probe 74 to the control assembly 72. The guide tube 76 may be configured as a conduit to housing and protect wiring extending between the probe 74 and the control assembly 72. The guide tube 76 may be a flexible body. For example, the guide tube 76 may include one or more internal actuators for manipulating a configuration of the guide tube 76 to aid in maneuvering the probe 74 and the guide tube 76 within the propulsion system 68 to the component 66.

The control assembly 72 of FIG. 3 includes a signal generator 88, a measurement channel 90, a power supply 92, and a processing system 94. The signal generator 88 and the measurement channel 90 are electrically connected with the power supply 92. The power supply 92 may be, for example, as a direct current (DC) power supply 92 configured to supply DC power to the signal generator 88 and the measurement channel 90 to effect the operation thereof.

Figures 4, 5, 6:
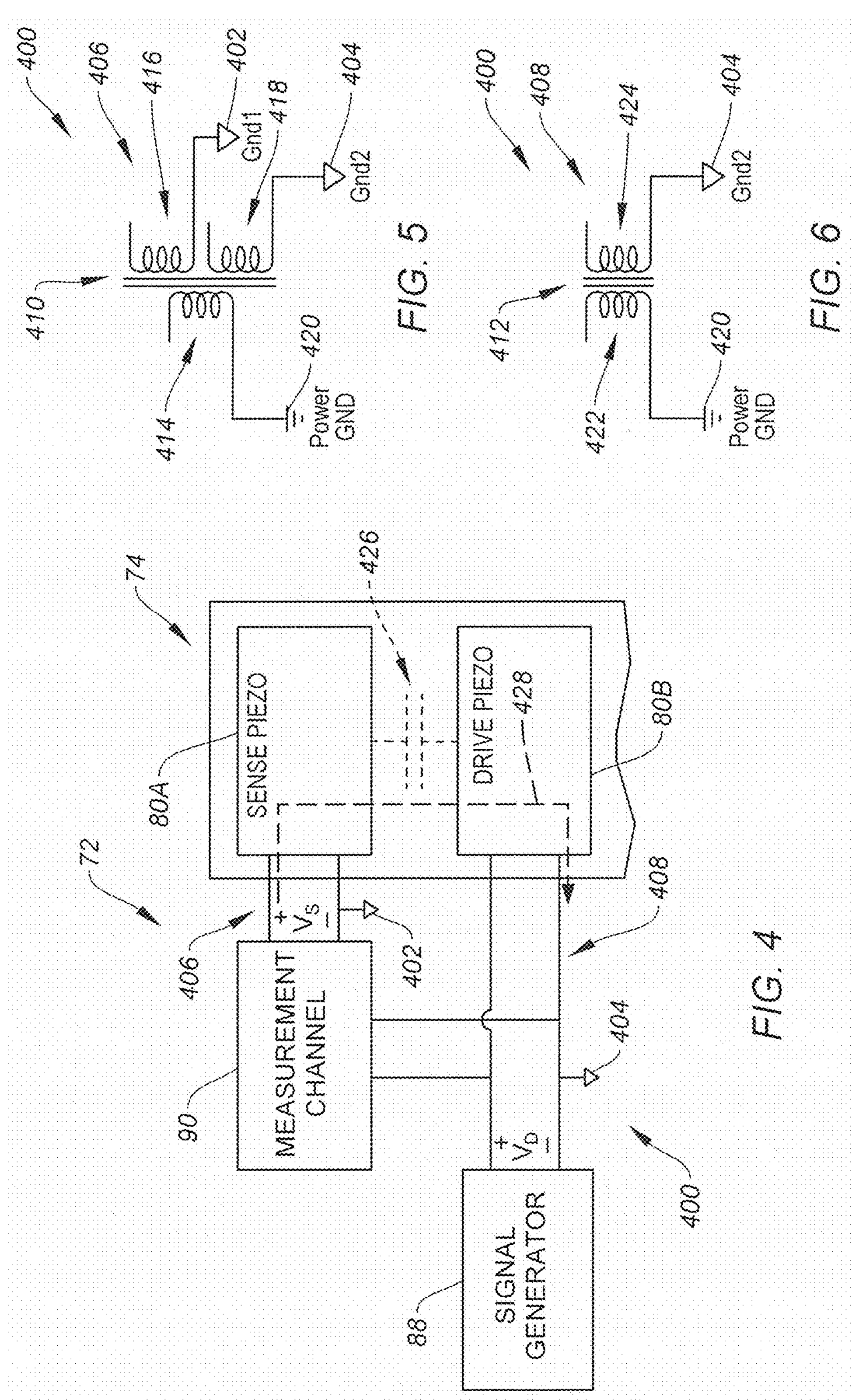
FIG. 4 schematically illustrates a portion of a control assembly for the inspection system of FIG. 3, in accordance with one or more embodiments of the present disclosure.
FIG. 5 schematically illustrates a portion of a grounding subassembly for the control assembly of FIG. 4, in accordance with one or more embodiments of the present disclosure.
FIG. 6 schematically illustrates another portion of the grounding subassembly for the control assembly of FIG. 4, in accordance with one or more embodiments of the present disclosure.

FIG. 4 schematically illustrates portions of the probe assembly 70 and the control assembly 72 in greater detail. The signal generator 88 is electrically connected to the drive piezo. The signal generator 88 is configured to generate a high-frequency alternating current (AC) signal (e.g., a sinusoidal driving voltage signal $V_D$) and apply the AC signal to the drive transducer to control the drive piezo 80B to generate ultrasonic vibration for application to the component 66. The measurement channel 90 is electrically connected to the sense piezo 80A. The measurement channel 90 is configured to measure a vibratory response of the sense piezo 80A. In particular, the measurement channel 90 is configured to receive a high-frequency AC signal (e.g., a sinusoidal sense voltage signal $V_S$) generated by the sense piezo 80A. The measurement channel 90 may additionally be electrically connected to the signal generator 88 to receive the driving voltage signal $V_D$. The measurement channel 90 may be configured to convert an analog driving voltage signal $V_D$ and/or an analog sense voltage signal $V_S$ to a digital signal for analysis by the processing system 94.

Referring to FIGS. 4-6, the control assembly 72 may further include an electrical grounding subassembly 400. The control assembly 72 of the present disclosure, however, is not limited to use with (e.g., inclusion of) the grounding subassembly 400. The grounding subassembly 400 of FIG. 4 includes a first ground (Gnd1) 402 and a second ground (Gnd2) 404. The first ground 402 is disposed on a sense circuit 406 of the control assembly 72 electrically interconnecting the measurement channel 90 and the sense piezo 80A. The second ground 404 is disposed on a drive circuit 408 of the control assembly 72 electrically interconnecting the signal generator 88 with the drive piezo 80B and the measurement channel 90. The first ground 402 and the second ground 404 are galvanically isolated from one another. In other words, the first ground 402 and the second ground 404 are isolated from one another such that there is no direction electrical current path between the first ground 402 and the second ground 404.

The grounding subassembly 400 of FIGS. 5 and 6 includes a first transformer 410 and a second transformer 412 configured to effect galvanic isolation of the first ground 402 and the second ground 404. FIG. 5 schematically illustrates a portion of the grounding subassembly 400, for the measurement channel 90 (e.g., the sense circuit 406), including the first transformer 410. The first transformer 410 includes a primary coil 414, a first secondary coil 416, and a second secondary coil 418. The primary coil 414 is electrically connected to a power supply ground (Power GND) 420 of the power supply 92. The first secondary coil 416 is electrically connected to the first ground 402. The second secondary coil 418 is electrically connected to the second ground 404. FIG. 6 schematically illustrates a portion of the grounding subassembly 400, for the signal generator 88 (e.g., the drive circuit 408), including the second transformer 412. The second transformer 412 includes a primary coil 422 and a secondary coil 424. The primary coil 422 is electrically connected to the power supply ground 420. The secondary coil 424 is electrically connected to the second ground 404. The present disclosure, however, is not limited to the foregoing exemplary configuration of the grounding sub assembly including the first transformer 410 and the second transformer 412 for galvanically isolating the first ground 402 and the second ground 404. For example, the grounding subassembly 400 may alternatively include capacitors, relays, or other electrical components suitable for galvanically isolating the first ground 402 and the second ground 404.

As schematically illustrated in FIG. 4, in the absence of the present disclosure grounding subassembly 400 (e.g., galvanic isolation of the first ground 402 from the second ground 404), a parasitic capacitance 426 may develop between the sense piezo 80A and the drive piezo 80B during operation of the probe 74. For example, the parasitic capacitance 426 may develop between the sense piezo 80A and the drive piezo 80B in an axially stacked piezo configuration, such as the axially stacked piezo configuration illustrated in FIGS. 3 and 4. The parasitic capacitance 426 may contribute to an electrical coupling between the sense circuit 406 and the drive circuit 408. For example, the parasitic capacitance 426 may form an electrical current flow path 428 from the sense circuit 406, through the sense piezo 80A and the drive piezo, to the drive circuit 408 (e.g., to the second ground 404). This electrical coupling between the sense circuit 406 and the drive circuit 408 may complicate accurate interpretation of the voltages (e.g., the sense voltage signal $V_S$ and the drive voltage signal $V_D$) across the sense piezo 80A and the drive piezo 80B (e.g., as measured by the measurement channel 90 and the processing system 94). Accordingly, the present disclosure grounding subassembly 400 facilitates more accurate measurement of piezo sense and drive voltage signals by preventing or minimizing parasitic capacitance 426 between the sense piezo 80A and the drive piezo.

The processing system 94 may be connected in signal communication with at least some of the components of the control assembly 72 (e.g., the signal generator 88, the measurement channel 90, etc.) to control and/or receive signals therefrom to perform the functions described herein. The processing system 94 includes a processor 96 and memory 98 connected in signal communication with the processor. The processor 96 may include any type of computing device, computational circuit, processor(s), CPU, computer, or the like capable of executing a series of instructions that are stored in memory 98. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the inspection system 64 to accomplish the same algorithmically and/or coordination of inspection system 64 components. The memory 98 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the control assembly 72 and its processing system 94. The processing system 94 may include, or may be in communication with, an input device that enables a user to enter data and/or instructions, and may include, or be in communication with, an output device configured, for example to display information (e.g., a visual display or a printer), or to transfer data, etc. Communications between the processing system 94 and the inspection system 64 and its components may be via a hardwire connection or via a wireless connection. A person of skill in the art will recognize that portions of the processing system 94 may assume various forms (e.g., digital signal processor, analog device, etc.) capable of performing the functions described herein.

Figure 7:
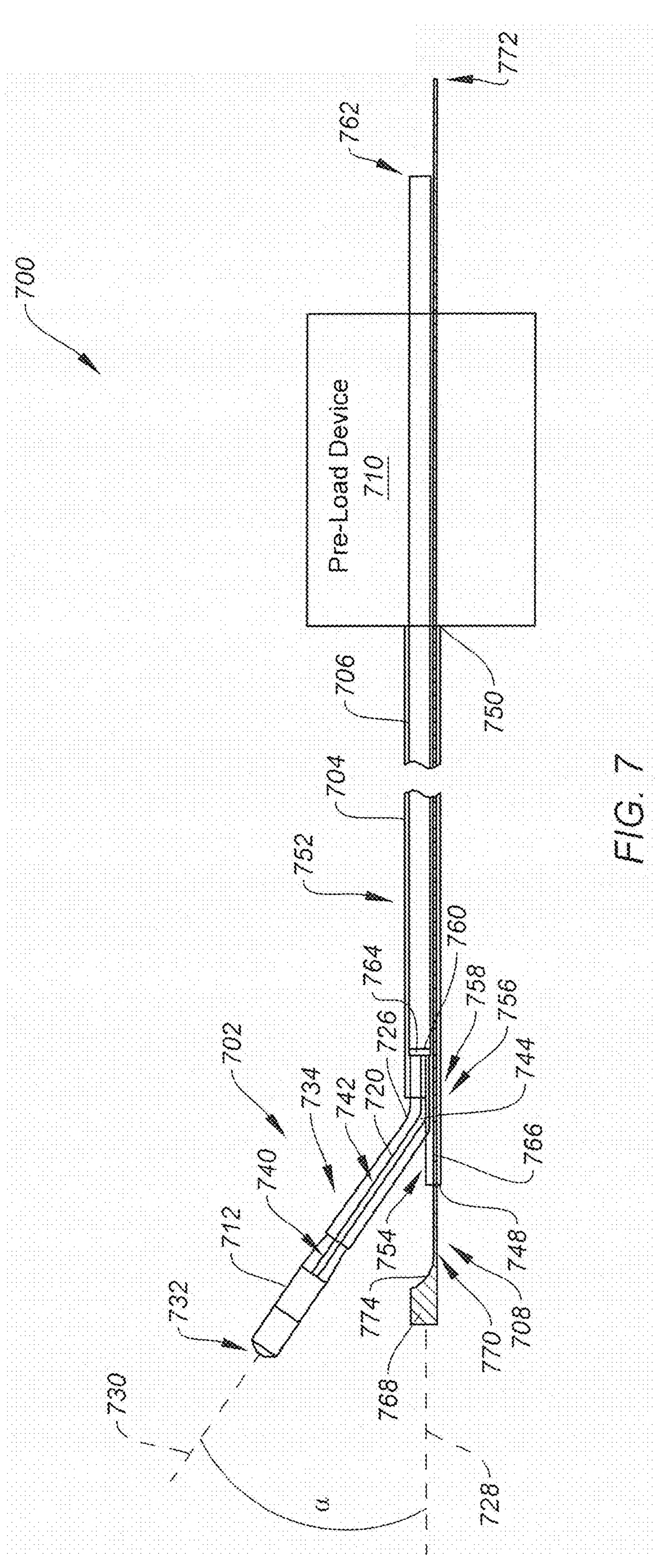
FIG. 7 illustrates a side view of a probe assembly for an inspection system, in accordance with one or more embodiments of the present disclosure.
Figure 8:
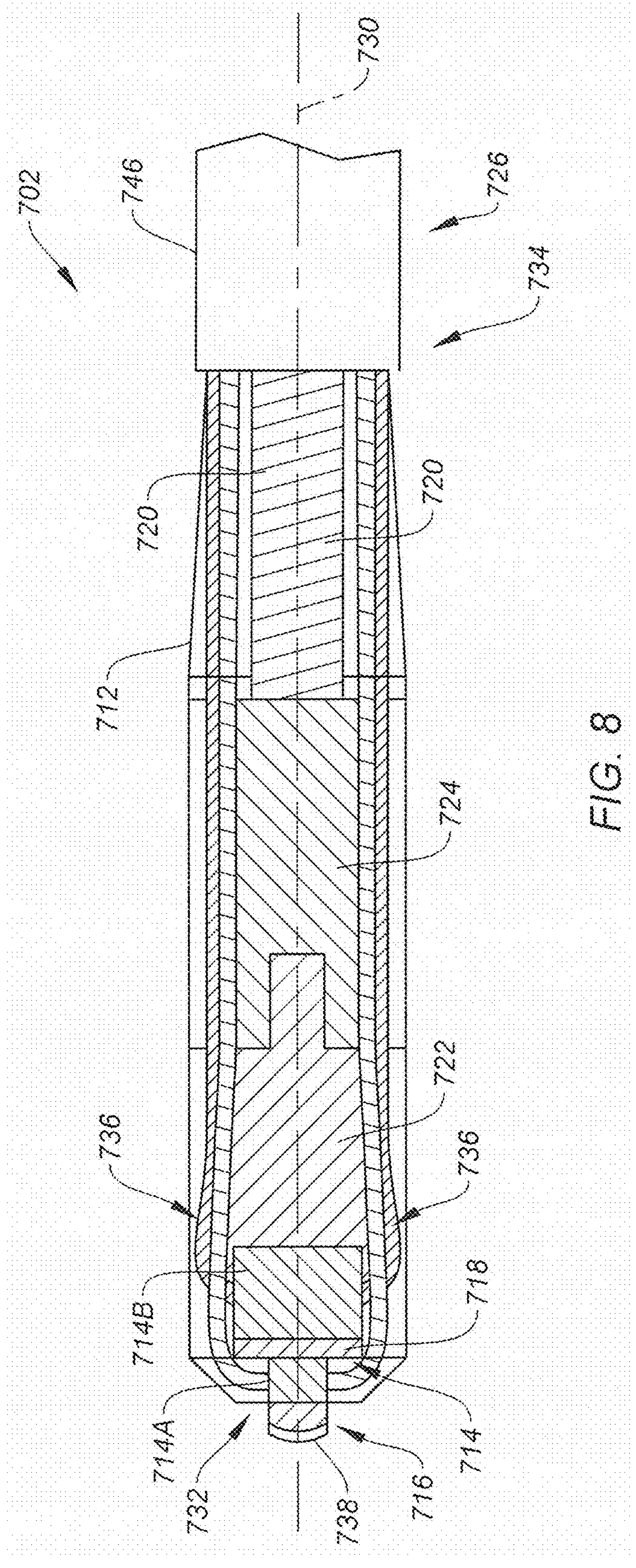
FIG. 8 illustrates a cutaway, side view of a probe for the probe assembly of FIG. 7, in accordance with one or more embodiments of the present disclosure.

FIGS. 7 and 8 illustrate a probe assembly 700. FIG. 7 illustrates a side view of the probe assembly 700. FIG. 8 illustrates a cutaway view of a portion (e.g., a probe) of the probe assembly 700. The probe assembly 700 may be used with the inspection system 64 (see FIG. 3). For example, the probe assembly 70 of FIG. 3 may include or be formed by the probe assembly 700. However, the inspection system 64 is not limited to use with the probe assembly 700. The probe assembly 700 is configured as a borescope probe assembly for insertion into an aircraft propulsion system 68 for inspection of a test component (e.g., the propulsion system 68 and the component 66 of FIG. 3). The probe assembly 700 of FIG. 7 includes a probe 702, an outer guide tube 704, an inner tube 706, and a wedge member 708. The probe assembly 700 may further include a pre-load device 710.

The probe 702 of FIGS. 7 and 8 includes a probe housing 712, one or more piezoelectric transducers 714, a tip member 716, a separator member 718, one or more shape-memory alloy (SMA) rods 720, a tail mass 722, a vibration isolator 724, and a cable assembly 726. The probe 702 and its components are configured for axial translation along a longitudinal axis 728 of the probe assembly 700 (e.g., within the outer guide tube 704).

The probe housing 712 extends along probe axis 730 (e.g., a longitudinal axis or centerline axis) of the probe 702 between and to a distal end 732 of the probe housing 712 and a proximate end 734 of the probe housing 712. The probe housing 712 may extend circumferentially about (e.g., completely around) the probe axis 730 between and to the distal end 732 and the proximate end 734.

The piezoelectric transducers 714 of FIG. 8 are disposed within the probe housing 712 at (e.g., on, adjacent, or proximate) the distal end 732. The piezoelectric transducers 714 of FIG. 8 include a sense piezo 714A and a drive piezo 714B. The sense piezo 714A and the drive piezo 714B are disposed on the probe axis 730 in an axially stacked (e.g., double-stacked) piezo configuration. Each of the sense piezo 714A and the drive piezo 714B may be centered about the probe axis 730. The sense piezo 714A is disposed at (e.g., on, adjacent, or proximate) the distal end 732 and the drive piezo 714B is disposed axially between the sense piezo 714A and the proximate end 734 along the probe axis 730. The sense piezo 714A and the drive piezo 714B are electrically connected with the control assembly 72 (see FIGS. 3 and 4) by wires 736.

The tip member 716 is disposed at (e.g., on, adjacent, or proximate) the distal end 732. For example, the tip member 716 may be connected to or otherwise disposed at (e.g., on, adjacent, or proximate) the sense piezo 714A at the distal end 732. All or a substantial portion of the tip member 716 may be disposed outside of (e.g., axially outside of) the probe housing 712. The tip member 716 forms a contact surface 738 configured for contact with a test component (e.g., the component 66 of FIG. 3). The contact surface 738 may form or be configured to form a single point-of-contact between the probe 702 and the component 66. The contact surface 738 may form a distal end of the probe 702 (e.g., relative to the probe axis 730). The contact surface 738 may have a hemispherical or spherical dome shape (e.g., centered about the probe axis 730), however, the present disclosure is not limited to any particular shape of the contact surface 738. The tip member 716 is formed all or in substantial part by a tip member material. For example, the tip member material may be alumina (aluminum oxide, $Al_2O_3$) or another suitable hard and electrically insulative tip member material.

The separator member 718 is disposed axially between the sense piezo 714A and the drive piezo 714B along the probe axis 730 to facilitate electrical isolation of the sense piezo 714A from the drive piezo 714B. For example, the separator member 718 may extend (e.g., axially extend) between and to the sense piezo 714A and the drive piezo 714B. The separator member 718 may be configured, for example, as a disk-shaped plate. The separator member 718 is formed all or in substantial part by a separator member material. The separator material may be the same as or similar to the tip member material for the tip member 716. For example, the separator member material may be alumina (aluminum oxide, $Al_2O_3$) or another suitable hard and electrically insulative tip member material.

The SMA rods 720 are disposed at (e.g., on, adjacent, or proximate) the proximate end 734. For example, a first longitudinal portion 740 of each of the SMA rods 720 is disposed within the probe 702 (e.g., the probe housing 712) and a second longitudinal portion 742 of each of the SMA rods 720 is disposed within the cable assembly 726. The probe 702 of FIGS. 7 and 8 includes two SMA rods 720, however, the present disclosure is not limited to any particular quantity of the SMA rods 720. The SMA rods 720 are trained to remember a specific angular bend 744. FIG. 7 illustrates the SMA rods 720 in a remembered shape so as to form the angular bend 744 on the second longitudinal portion 742. The SMA rods 720 are configured to position the probe 702 to form a predetermined angle α between the longitudinal axis 728 and the probe axis 730 with the SMA rods 720 in their remembered shape (e.g., forming the angular bend 744), as will be discussed in further detail. The predetermined angle α may typically be between about 10 degrees and about 80 degrees, however, the present disclosure is not limited to any particular value of the predetermined angle α. The angular bend 744 is disposed within the cable assembly 726 and outside of the probe housing 712. The SMA rods formed all or in substantial part by a shape-memory alloy material such as, but not limited to, nickel-titanium (NiTi), copper-aluminum-nickel, or another suitable shape-memory alloy material which may be trained to remember and precisely form the angular bend 744, for example, within a suitable temperature range for inspection of the component 66 (see FIG. 3).

The tail mass 722 is disposed at (e.g., on, adjacent, or proximate) the drive piezo 714B, for example, axially between the drive piezo 714B and the proximate end 734 along the probe axis 730. The tail mass may be formed, for example, by a heavy metal or metal alloy such as, but not limited to, steel, brass, tungsten, or the like.

The vibration isolator 724 is disposed between the tail mass 722 and the SMA rods 720 along the probe axis 730. For example, the vibration isolator 724 may interconnect the tail mass 722 and the SMA rods 720 (e.g., the first longitudinal portion 740). The vibration isolator 724 is configured to facilitate vibratory isolation of the piezoelectric transducers 714 from other components of the probe assembly 700 and its probe 702 including, for example, the SMA rods 720 and the pre-load device 710. The vibration isolator 724 may be formed by a suitable low-density and/or resilient vibration damping material such as an elastomeric material.

The cable assembly 726 extends between and to the probe 702 and the control assembly 72. The cable assembly 726 is a flexible assembly including the wires 736 and a cable wrap 746. The cable wrap 746 (e.g., a thermoplastic cable wrap) surrounds and protects the wires 736 along all or at least a portion of the length of the cable assembly 726 from the probe housing 712 (e.g., the proximate end 734) toward the control assembly 72. The cable assembly 726 extends through the inner tube 706.

The outer guide tube 704 is a rigid tubular body extending (e.g., axially extending) along the longitudinal axis 728 between and to a distal end 748 of the outer guide tube 704 and a proximate end 750 of the outer guide tube 704. The distal end 748 is disposed at (e.g., on, adjacent, or proximate) the probe 702. The proximate end 750 is disposed at (e.g., on, adjacent, or proximate) the pre-load device 710. The outer guide tube 704 includes an enclosed tube portion 752 and an open tube portion 754. The enclosed tube portion 752 extends circumferentially about (e.g., completely around) the longitudinal axis 728. The enclosed tube portion 752 extends (e.g., axially extends) between and to the proximate end 750 and the open tube portion 754. The open tube portion 754 extends parti-circumferentially about the longitudinal axis 728. For example, the open tube portion 754 may have a semi-circular or circular segment cross-sectional shape relative to the longitudinal axis 728 (e.g., on a plane perpendicular to the longitudinal axis 728). The open tube portion 754 extends (e.g., axially extends) between and to the enclosed tube portion 752 and the distal end 748. An interface 756 between the enclosed tube portion 752 and the open tube portion 754 may be disposed proximate the distal end 748 such that the enclosed tube portion 752 forms a significantly greater axial length of the outer guide tube 704 than the open tube portion 754.

The outer guide tube 704 may include a wear strip 758 disposed at (e.g., on, adjacent, or proximate) the interface 756. The wear strip 758 may be disposed on an interior surface of the outer guide tube 704 along the enclosed tube portion 752 and the open tube portion 754. The wear strip 758 may include or be formed by a low-friction and wear-resistant material such as, but not limited to, ultra-high-molecular-weight polyethylene (UHMW), polytetrafluoroethylene (PTFE), or the like. The wear strip 758 may protect and facilitate reduced wear of the cable assembly 726 (e.g., the cable wrap 746), particularly at the location of the angular bend 744, as the cable assembly 726 translates within the outer guide tube 704 and pivots relative to the longitudinal axis 728 (e.g., at the angular bend 744).

The inner tube 706 is a rigid tubular body disposed within the outer guide tube 704. The inner tube 706 is configured for translation within and relative to the outer guide tube 704 along the longitudinal axis 728. The inner tube 706 extends (e.g., axially extends) along the longitudinal axis 728 between and to a distal end 760 of the inner tube 706 and a proximate end 762 of the inner tube 706. The distal end 760 is coupled to a portion of the cable assembly 726 axially spaced from the probe 702. For example, the distal end 760 of FIG. 7 is coupled (e.g., fixedly connected) to the cable assembly 726 by an adapter 764 disposed within the outer guide tube 704. The proximate end 762 is disposed outside of (e.g., axially outside of) the outer guide tube 704 at (e.g., on, adjacent, or proximate) the pre-load device 710. The inner tube 706 extends circumferentially about (e.g., completely around) the longitudinal axis 728 and an axial portion of the cable assembly 726.

The wedge member 708 includes a rod 766 (e.g., a pushrod) and a wedge body 768. The rod 766 extends (e.g., axially extends) along the longitudinal axis 728 between and to a distal end 770 of the rod 766 and a proximate end 772 of the rod 766. The distal end 770 is disposed at (e.g., on, adjacent, or proximate) the open tube portion 752. The proximate end 772 is disposed outside of (e.g., axially outside of) the outer guide tube 704 at (e.g., on, adjacent, or proximate) the pre-load device 710. The rod 766 extends through the outer guide tube 704 radially between the inner tube 706 and the outer guide tube 704. The wedge body 768 is connected to or otherwise disposed on the distal end 770. The wedge body 768 includes a wedge surface 774 facing toward the probe 702 and its cable assembly 726. The wedge surface 774 may be oriented parallel to or substantially parallel to the probe axis 730 with the probe axis 730 oriented at the predetermined angle α relative to the longitudinal axis 728 (e.g., with the SMA rods 720 forming the angular bend 744), or otherwise generally conforming to a shape of the cable assembly 726 at (e.g., on, adjacent, or proximate) the angular bend 744 (e.g., an outside of the angular bend 744). The wedge body 768 is configured to axially translate (e.g., with the rod 766) along and within the outer guide tube 704 (e.g., the open tube portion 754).

The pre-load device 710 is configured to be mounted to a fixed structure of the propulsion system 68 (see FIG. 3; e.g., a portion of the engine static structure 36 (see FIG. 2)) to securely position the probe assembly 700 relative to the propulsion system 68 and its component 66. The pre-load device 710 may be selectively engageable with the inner tube 706. The pre-load device may be configured to apply a predetermined axial biasing force to the inner tube 706 in an axial direction, relative to the longitudinal axis, toward the distal end 760.

Figures 9A, 9B, 9C:
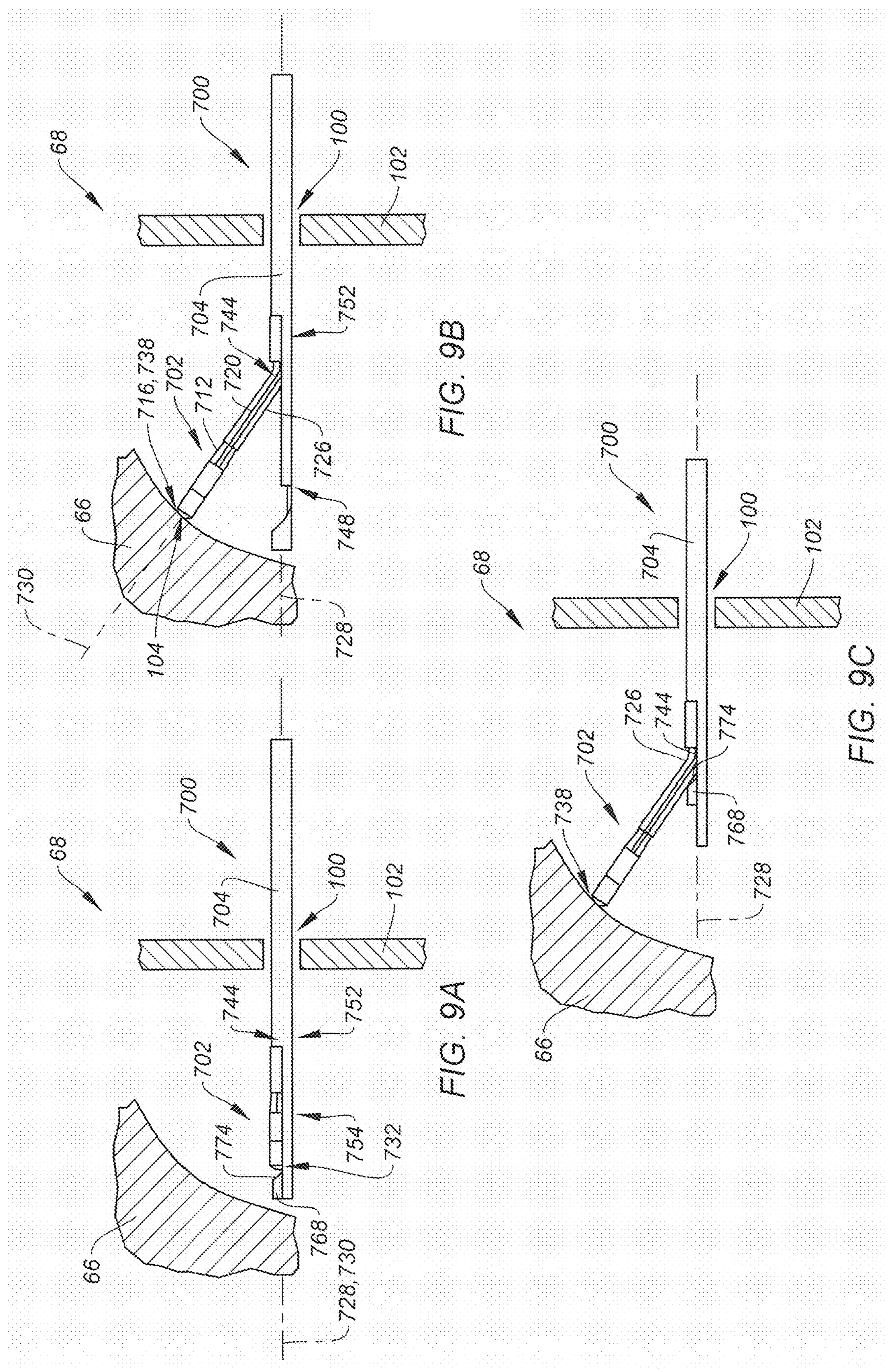
FIGS. 9A-C schematically illustrate a sequence of probe assembly configurations for positioning the probe assembly at a component of an aircraft propulsion system, in accordance with one or more embodiments of the present disclosure.

Referring now to FIGS. 3, 7, 8, and 9A-C, the operation of the inspection system 64 will be described in further detail. FIGS. 9A-C schematically illustrate a sequence of probe assembly 700 operations to position the probe 702 at (e.g., on, adjacent, or proximate) the component 66 of the aircraft propulsion system 68. The probe assembly 700 is inserted into the propulsion system 68 by an operator, for example, through one or more borescope ports or other access openings of the propulsion system 68 (e.g., the gas turbine engine 24 of the propulsion system 22; see FIG. 2). As shown in FIGS. 9A-C, portions of the probe assembly 700, including the probe 702, the outer guide tube 704, the inner tube 706 (see FIG. 7), and the wedge member 708, may be inserted together into the propulsion system 68 (e.g., the gas turbine engine 24 of the propulsion system 22) through an opening 100, for example, in an engine case 102 of the engine static structure 36. The probe assembly 700 is positioned at (e.g., on, adjacent, or proximate) the component 66.

As shown in FIG. 9A, the probe assembly 700 is inserted into the propulsion system 68 with the probe 702 in a retracted condition relative to the outer guide tube 704. In this retracted condition, the probe 702 is disposed within the outer guide tube 704 (e.g., within the open tube portion 754 and/or the enclosed tube portion 752). In this condition, the probe axis 730 may be substantially colinear with, parallel to, and/or on or directly adjacent the longitudinal axis 728 (e.g., the probe axis 730 may be aligned with the longitudinal axis 728). The angular bend 744 location of the SMA rods 720 is disposed within the enclosed tube portion 752 such that the enclosed tube portion 752 constrains the angular bend 744 to retain the probe 702 within the outer guide tube 704 with the probe axis 730 aligned with the longitudinal axis 728. The wedge body 768 (e.g., the wedge surface 774) is disposed at (e.g., on, adjacent, or proximate) the distal end 732.

As shown in FIG. 9B, the probe 702 is positioned in a deployed condition relative to the outer guide tube 704. In this deployed condition, the probe 702 is positioned relative to the component 66 with the probe 702 (e.g., the contact surface 738 of the tip member 716) positioned on a predetermined ultrasonic test location 104 of the component 66. For example, the probe 702 is positioned on the component 66 at a single point-of-contact between the contact surface 738 and the test location 104. To position the probe 702 on the test location 104 (e.g., in the deployed condition), an operator may push (e.g., translate) the inner tube 706 (see FIG. 7; e.g., the proximate end 762) in an axial direction toward the distal end 760 (see FIG. 7), relative to the longitudinal axis 728, thereby pushing portions of the probe housing 712 and the cable assembly 726 out of the enclosed tube portion 752 toward the distal end 748. As the angular bend 744 location of the SMA rods 720 translates out of the enclosed tube portion 752, the SMA rods 720 form the angular bend 744, thereby pivoting the probe 702 to position the contact surface 738 at (e.g., on, adjacent, or proximate) the test location 104 with the probe 702 positioned forming the predetermined angle α between the longitudinal axis 728 and the probe axis 730 (see FIG. 7). The SMA rods 720 and their remembered angular bend 744 aid precise positioning of the probe 702 (e.g., the contact surface 738) at the test location 104 to facilitate accurate and repeatable inspection of the component 66.

As shown in FIG. 9C, the wedge body 768 (e.g., the wedge surface 774) is positioned in contact with the cable assembly 726 at (e.g., on, adjacent, or proximate) the angular bend 744 to stabilize the position of the probe 702 relative to the test location 104. To position the wedge surface 774 in contact with the cable assembly 726, an operator may pull (e.g., translate) the rod 766 (see FIG. 7; e.g., the proximate end 772) in an axial direction toward the proximate end 772, relative to the longitudinal axis 728, thereby pulling the wedge surface 774 against the cable assembly 726.

With the probe 702 (e.g., the contact surface 738) positioned on the test location 104 of the component 66, the processing system 94 may control the signal generator 88 to generate and apply a driving voltage signal $V_D$ to the drive piezo 714B (see, e.g., FIG. 4), thereby inducing vibration (e.g., ultrasonic vibration) in the component 66. For example, the vibration of the drive piezo 714B may be transmitted into the component 66 through the preloaded contact between the tip member 716 (e.g., the contact surface 738) and the component 66. The processing system 94 may control the signal generator 88 to induce vibration of the drive piezo 714B along a range of frequencies to facilitate mapping of a vibratory response signature of the component 66. The vibratory response of the component 66 induces a sense voltage signal $V_S$ of the sense piezo 714A (see, e.g., FIG. 4), which sense voltage signal $V_S$ is indicative of the vibratory response of the component 66. The measurement channel 90 may convert the sense voltage signal $V_S$ to a digital signal as resonance data to the processing system 94. The processing system 94, for example, may analyze the measured vibratory response using the resonance data to determine resonant frequencies and/or other structural mode parameters for the component 66. Where these resonant frequencies and/or other structural mode parameters) of the component 66 match (or are within a tolerance of) corresponding expected resonant frequencies and/or other structural mode parameters for a model component (e.g., a computer-modeled component, a previously inspected component, etc.) without any internal defects, the processing system 94 may determine the component 66 does not include, or there is a low probability that the component 66 includes, any internal defects. By contrast, where one or more of the resonant frequencies and/or other structural mode parameters do not match (or are outside tolerance of) the corresponding expected resonant frequencies and/or other structural mode parameters for the model component without any internal defects, the processing system 94 may determine the component 66 does include, or there is a high probability that the component 66 includes, one or more internal defects. In response to identification of a defect or a high probability of a defect, inspection personnel may take appropriate next steps to further inspect the component 66 and/or initiate a process for replacing the propulsion system 68, repairing the component 66, or replacing the component 66.

Figure 10:
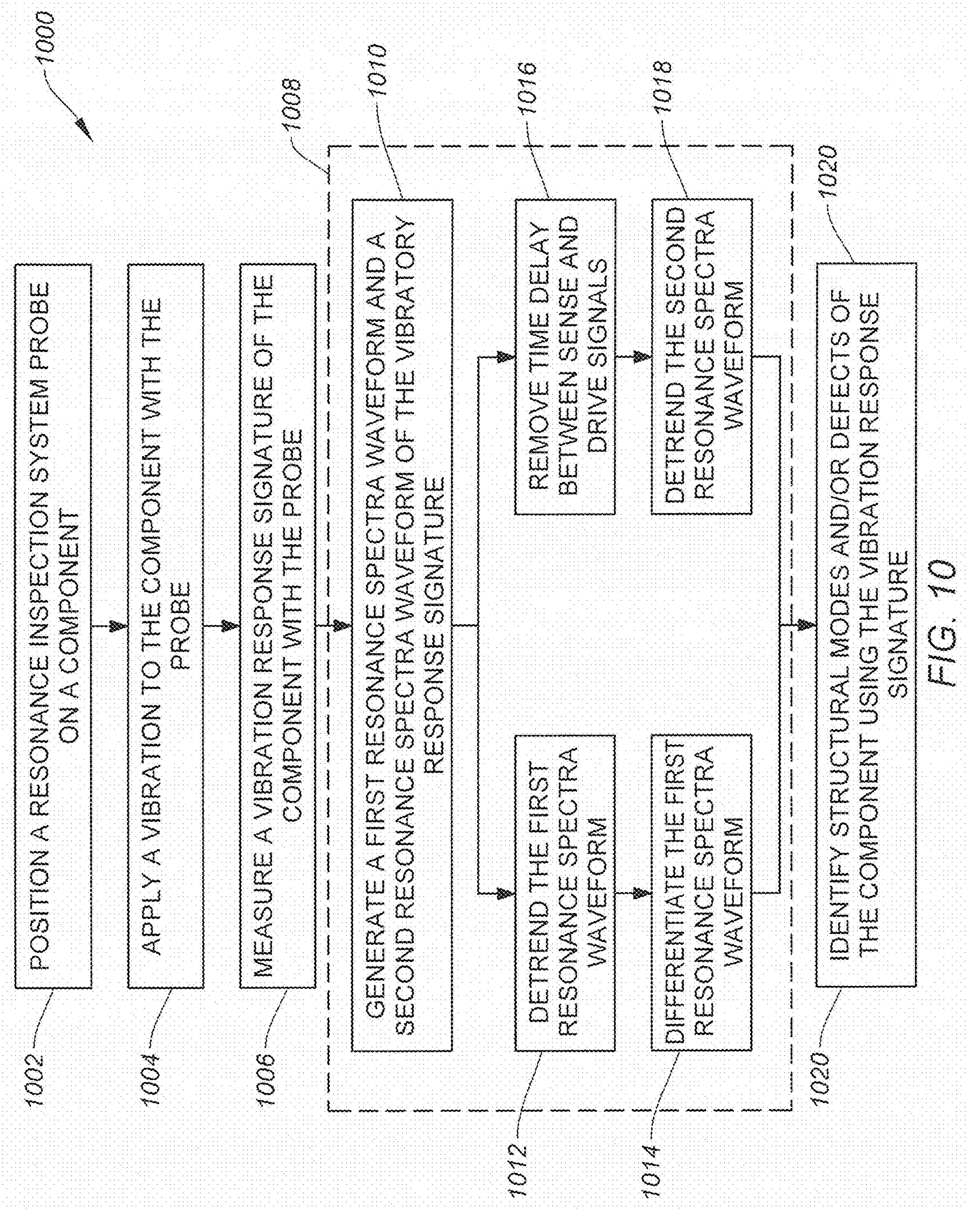
FIG. 10 illustrates a block diagram depicting a method for structural mode and defect identification using resonance inspection data, in accordance with one or more embodiments of the present disclosure.

Referring to FIG. 10, a method 1000 for identifying structural modes and/or defects of a component (e.g., an aircraft propulsion system component; the component 66 (see FIGS. 3 and 9A-C)) using resonance inspection data is provided. FIG. 10 illustrates a flowchart for the method 1000. Aspects of the method 1000 are described herein for the component 66 and the inspection system 64. The control assembly 72 and its processing system 94 may be used to execute or control one or more steps of the method 1000. For example, the processor 96 may execute instructions stored in the memory 98, thereby causing the processing system 94 and/or its processor 96 to execute or otherwise control one or more steps of the method 1000. However, the method 1000 is not limited to use with the particular inspection system 64, probe assemblies, component 66, or the aircraft propulsion system 22, 68 of the present disclosure. Unless otherwise noted herein, it should be understood that the steps of method 1000 are not required to be performed in the specific sequence in which they are discussed below and, in some embodiments, the steps of the method 1000 may be performed separately or simultaneously.

Step 1002 includes positioning the probe 74, 702 on the component 66. For example, an operator may operate the probe assembly 70, 700 to insert the probe 74, 702 into the propulsion system 68 to position the probe 74, 702 on the component 66, as previously discussed. The probe 74, 702 may be positioned on the component 66 with the component 66 installed in the propulsion system 68 and with the propulsion system 68 installed on or removed from an associated aircraft (e.g., the aircraft 20; see FIG. 1). Alternatively, the probe 74, 702 may be positioned on the component 66 with the component 66 removed from the propulsion system 68.

Step 1004 includes applying a vibration (e.g., an ultrasonic vibration) to the component 66 with the probe 74, 702. For example, the processing system 94 may control the signal generator 88 to induce vibration of the drive piezo 80B, 714B along a range of frequencies to facilitate mapping of a vibratory response signature of the component 66.

Step 1006 includes measuring the vibratory response signature of the component 66 while applying the vibration to the component 66 (see step 1004). As previously discussed, the vibratory response of the component 66 includes a sense voltage signal $V_S$ of the sense piezo 80A, 714A (see, e.g., FIG. 4), which sense voltage signal $V_S$ is indicative of the vibratory response of the component 66. The measurement channel 90 may convert the sense voltage signal $V_S$ to a digital signal as resonance data to the processing system 94. The resonance data may include the vibratory response signature of the component 66 over the range of frequencies applied to the component 66 by the drive piezo 80B, 714B.

The method 1000 includes a plurality of processing steps 1008 for processing the vibratory response signature of the component 66 with the processing system 94. The processing system 94 may process the resonance data (e.g., the vibratory response signature of the component 66) over all or a portion of the frequency range of the vibratory response signature to generate or otherwise identify a plurality of different resonance spectra waveforms of the vibratory response signature. For example, the processing system 94 may process the vibratory response signature for all or a subset (e.g., a 20 KHz frequency increment) of the frequency range of the vibratory response signature. The resonance spectra waveforms may identify parts of the vibratory response signature including a magnitude (decibels (dB)) spectra part, a phase (degrees) spectra part, a real spectra part, and/or an imaginary (complex) spectra part.

Figure 11:
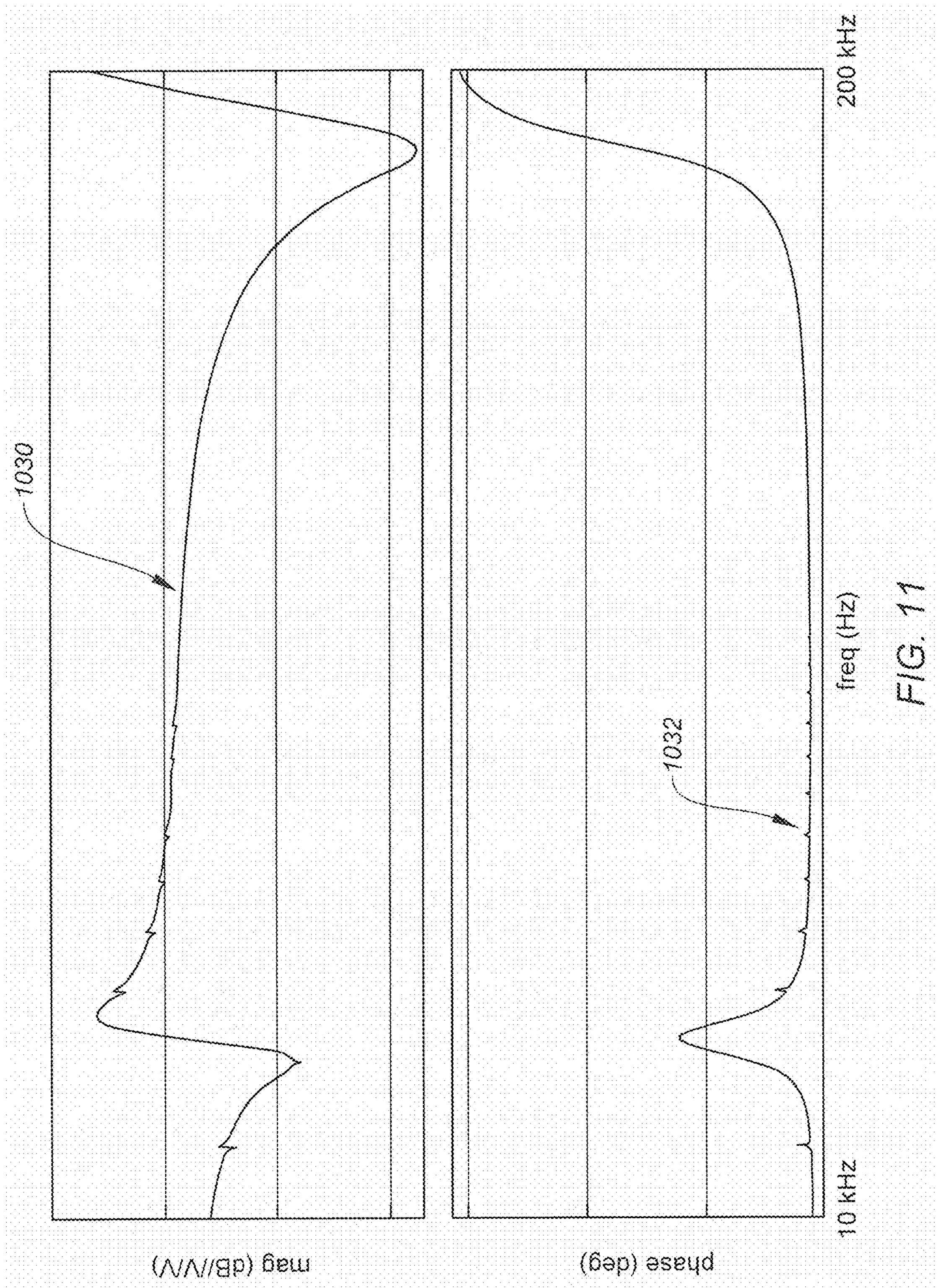
FIG. 11 illustrates exemplary resonance spectra waveforms of resonance inspection data, in accordance with one or more embodiments of the present disclosure.
Figure 12:
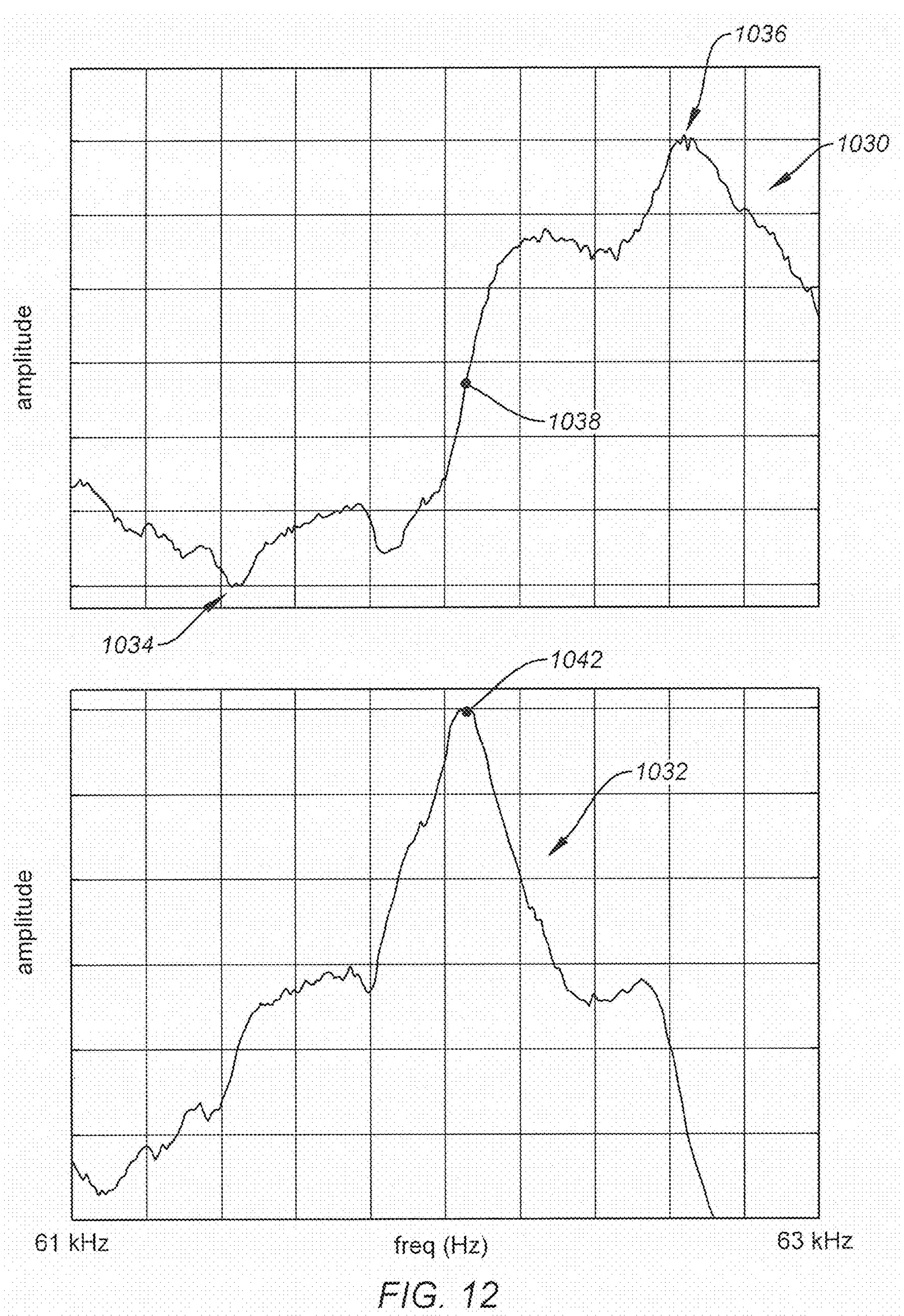
FIG. 12 illustrates exemplary resonance spectra waveforms of resonance inspection data, in accordance with one or more embodiments of the present disclosure.
Figure 13:
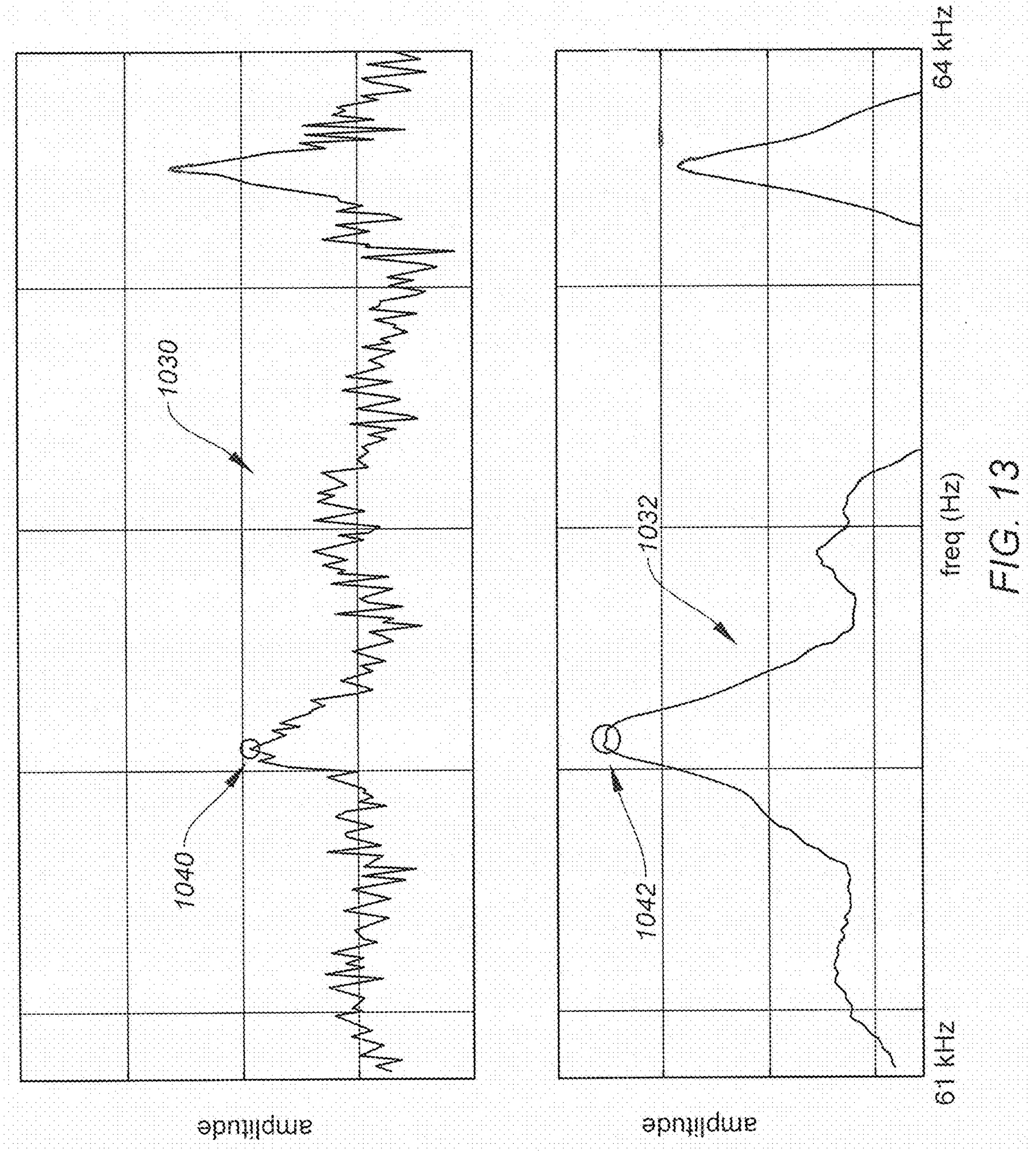
FIG. 13 illustrates exemplary resonance spectra waveforms of resonance inspection data, in accordance with one or more embodiments of the present disclosure.

With reference to FIGS. 11-13, step 1010 includes generating a first resonance spectra waveform 1030 and a second resonance spectra waveform 1032. FIGS. 11-13 illustrate the first resonance spectra waveform 1030 and the second resonance spectra waveform 1032 over a given exemplary frequency ranges. The present disclosure, however, is not limited to any particular frequency range of the first resonance spectra waveform 1030 and the second resonance spectra waveform 1032. The first resonance spectra waveform 1030 and the second resonance spectra waveform 1032 may be representative of waveforms generated and measured using an ultrasonic testing probe having a double-stack piezo configuration (e.g., the probe 74 and/or the probe 702). However, aspects of the present disclosure method 1000 may be similarly applicable to single-stack piezo configurations. The first resonance spectra waveform 1030 is different than the second resonance spectra waveform 1032. The first resonance spectra waveform 1030 is one of a magnitude spectra part or a real spectra part of the vibratory response signature for a given frequency range of the vibratory response signature. The magnitude spectra part and the real spectra part may exhibit similar waveform characteristics and/or represent a same or similar complex transfer function measurement. The second resonance spectra waveform 1032 is one of a phase spectra part or an imaginary spectra part of the vibratory response signature for the given frequency range of the vibratory response signature. The phase spectra part and the imaginary spectra part may exhibit similar waveform characteristics and/or represent a same or similar complex transfer function measurement. Where the first resonance spectra waveform 1030 is the magnitude spectra part, the second resonance spectra waveform 1032 is the phase spectra part. Similarly, where the first resonance spectra waveform 1030 is the real spectra part, the second resonance spectra waveform 1032 is the imaginary spectra part. For example, the first resonance spectra waveform 1030 of FIGS. 11-13 is a magnitude spectra part of the vibration response signature and the second resonance spectra waveform 1032 of FIGS. 11-13 is a phase spectra part of the vibration response signature. The first resonance spectra waveform 1030 and the second resonance spectra waveform 1032 are exemplary parts of the vibration response signature of the component 66 over the range of frequencies applied to the component 66 by the drive piezo 80B, 714B.

Step 1012 includes detrending the first resonance spectra waveform 1030. The first resonance spectra waveform 1030 may be detrended to remove dominant backbone characteristics of the first resonance spectra waveform 1030. Backbone characteristics of the first resonance spectra waveform 1030 may be representative of transfer function responses of the first resonance spectra waveform 1030 dictated, for example, by the configuration of the probe 74, 702 and/or pre-loading between the probe 74, 702 and the component 66. These backbone characteristics may be removed from the first resonance spectra waveform 1030 by detrending the first resonance spectra waveform 1030 using a detrending technique such as, but not limited to, a cepstral detrending technique, a polynomial detrending technique, or another suitable detrending technique conventionally known in the art. FIG. 12 illustrates an exemplary amplitude of the detrended first resonance spectra waveform 1030 for a subset portion of the frequency range of the vibratory response signature. In the detrended first resonance spectra waveform 1030, a structural mode of the component 66 may be characterized, for example, by a localized trough 1034, a subsequent localized peak 1036, and a maximum slope point 1038 of the first resonance spectra waveform 1030 (e.g., a "Z" feature of the first resonance spectra waveform 1030. The maximum slope point 1038 is disposed between the trough 1034 and the peak 1036 relative to the first resonance spectra waveform 1030 frequency. Step 1014 includes (e.g., optionally) differentiating the detrended first resonance spectra waveform 1030. FIG. 13 illustrates an exemplary amplitude of the differentiated, detrended first resonance spectra waveform 1030 for a subset portion of the frequency range of the vibratory response signature. The differentiated, detrended first resonance spectra waveform 1030 of FIG. 13 has a peak 1040 corresponding to the maximum slope point 1038 of the non-differentiated, detrended first resonance spectra waveform 1030.

Step 1016 includes (e.g., optionally) removing any time delay, between the drive voltage signal $V_D$ and the sense voltage signal $V_S$, from the second resonance spectra waveform 1032. Step 1018 includes detrending the second resonance spectra waveform 1032. Similar to that discussed above for step 1012, backbone characteristics of the second resonance spectra waveform 1032 may be removed by detrending the second resonance spectra waveform 1032 using a detrending technique such as, but not limited to, a cepstral detrending technique, a polynomial detrending technique, or another suitable detrending technique conventionally known in the art. FIGS. 12 and 13 illustrate different exemplary amplitudes of the detrended second resonance spectra waveform 1032 for a subset portion of the frequency range of the vibratory response signature. In the detrended second resonance spectra waveform 1032, a structural mode of the component 66 may be characterized, for example, by a localized peak 1042.

Step 1020 includes identifying structural modes and/or defects of the component 66 using the first resonance spectra waveform 1030 and the second resonance spectra waveform 1032. In particular step 1020 includes identifying structural modes using the detrended first resonance spectra waveform 1030 and the detrended second resonance spectra waveform 1032 (see FIGS. 12 and 13). For example, the processing system 94 may identify the peak 1042 of the detrended second resonance spectra waveform 1032, which peak 1042 is indicative of a structural mode of the component 66. The processing system 94 may confirm the structural mode of the component 66 based on identification of the max slope point 1038 (e.g., for the non-differentiated, detrended first resonance spectra waveform 1030; see FIG. 12) or the peak 1040 (e.g., for the differentiated, detrended first resonance spectra waveform 1032; see FIG. 13) at or approximately at the frequency of the peak 1042.

Figures 14A, 14B, 14C:
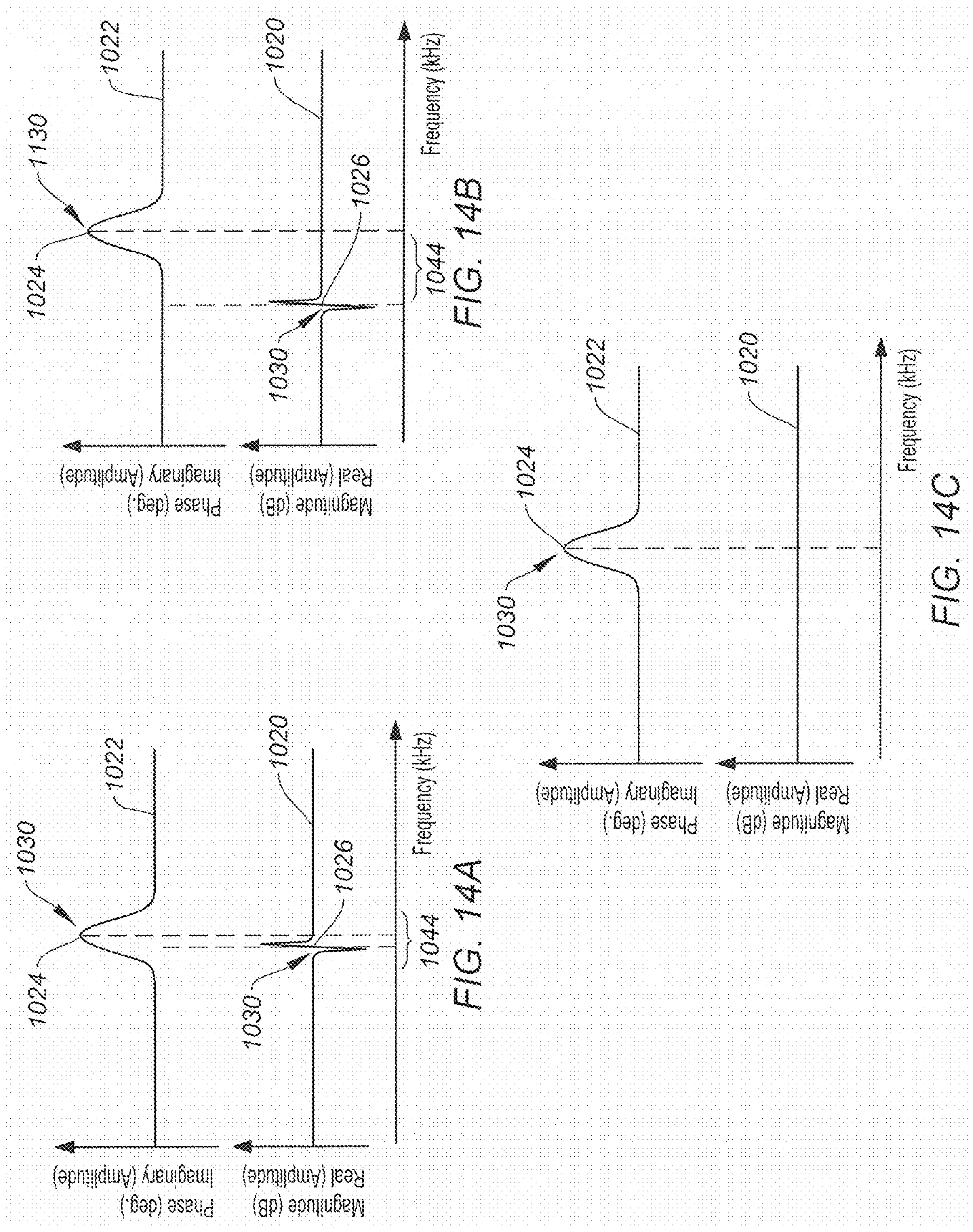
FIGS. 14A-C illustrate various exemplary resonance inspection data waveform relationships, in accordance with one or more embodiments of the present disclosure.

FIGS. 14A-C illustrate the first resonance spectra waveform 1030 and the second resonance spectra waveform 1032 for a subset portion of the frequency range of the vibratory response signature. The first resonance spectra waveform 1030 of FIGS. 14A-C is a differentiated, detrended first resonance spectra waveform 1030 (e.g., a magnitude part or a real part) and the second resonance spectra waveform 1032 is a detrended second resonance spectra waveform 1032 (e.g., a phase part or an imaginary part). The processing system 94 may identify a structural mode of the component 66 where one of the peaks 1040 of the first resonance spectra waveform 1030 and one of the peaks 1042 of the second resonance spectra waveform 1032 are identified by the processing system 94 within a predetermined frequency range threshold 1044. Routine experimentation and/or analysis may be performed by one of ordinary skill in the art to select a predetermined frequency range threshold suitable for identifying a structural mode of a given component, in accordance with and as informed by one or more aspects of the present disclosure. Analysis of the first resonance spectra waveform 1030 and the second resonance spectra waveform 1032, in accordance with the present disclosure, facilitates increased confidence in structural mode identification (e.g., differentiation from background noise) in comparison to at least some conventional structural mode identification processes.

FIGS. 14B and 14C illustrate exemplary portions of the first resonance spectra waveform 1030 and the second resonance spectra waveform 1032 which may correspond to a frequency range which does not include a structural mode for the component 66. As described above, the processing system 94 may analyze the first resonance spectra waveform 1030 and the second resonance spectra waveform 1032 and identify each peak 1040 and each peak 1042. The processing system 94 may identify an absence of a structural mode of the component 66 at a given frequency or frequency range (or alternatively the processing system 94 may not identify a presence of a structural mode of the component 66 at the given frequency or frequency range). Referring to FIG. 14B, for example, the processing system 94 may identify the absence of a structural mode (or may not identify the presence of a structural mode) of the component 66 where the peak 1040 and the adjacent (i.e., on the frequency range) peak 1042 have a frequency difference which is greater than the predetermined frequency range threshold 1044.

Additionally or alternatively, the processing system 94 may identify an absence of a structural mode of the component 66 at a given frequency or frequency range (or alternatively the processing system 94 may not identify a presence of a structural mode of the component 66 at the given frequency or frequency range) where the processing system 94 identifies the absence of one or both of the peaks 1040, 1042 at the given frequency or frequency range. As shown in FIG. 14C, for example, the first resonance spectra waveform 1030 includes the peak 1040, however, the second resonance spectra waveform 1032 does not include the corresponding peak 1042. Accordingly, the processing system 94 may identify the absence of a structural mode (or may not identify the presence of a structural mode) of the component 66) at or near the frequency of the peak 1040.

Identification of the presence or absence of structural modes of the component 66, as described for step 1020, may facilitate identifying (e.g., with the processing system 94 or another system) the component 66 includes at least one defect or has a high probability of including at least one defect (collectively a "defect condition") such as, but not limited to, an internal defect, using the first resonance spectra waveform 1030 and the second resonance spectra waveform 1032. A frequency or frequency range of an expected structural mode of the component 66 may be known from another instance of the component 66 such as, but not limited to, a model component (e.g., a computer-modeled component, a previously inspected component, etc.) without any internal defects.

Resonance-based inspection methods may facilitate rapid inspection of components (e.g., aircraft propulsion system components) in situ, however, identifying component-level structural modes and/or defects is challenging. For example, conventional resonance-based inspections of a component installed in an aircraft propulsion system may yield resonance inspection data for the component which reflects the structural modes and damping effects of adjacent components of the aircraft propulsion system, thereby complicating identification of structural modes and/or defects of the component under inspection. Moreover, for single point-ofcontact resonance inspection probes (e.g., the probe 702), analysis of a part of the vibratory response signature of a component (e.g., a magnitude part of the vibratory response signature) may be insufficient for accurately identifying structural modes of the component.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A resonance inspection system comprising:

a control assembly including a processing system, the processing system includes a processor in communication with a non-transitory memory storing instructions, which instructions when executed by the processor, cause the processor to:

process resonance data including a vibratory response signature of a component over a portion of a frequency range of the vibratory response signature to generate a plurality of different resonance spectra waveforms of the vibratory response signature, the plurality of different resonance spectra waveforms including a first resonance spectra waveform and a second resonance spectra waveform, and the first resonance spectra waveform is different than the second resonance spectra waveform;

detrend the first resonance spectra waveform and the second resonance spectra waveform; and identify a presence or an absence of a structural mode of the component using the first resonance spectra waveform and the second resonance spectra waveform, the presence of the structural mode is identified by determining the first resonance spectra waveform includes a maximum slope point at a first frequency of the portion of the frequency range, the second resonance spectra waveform includes a second peak at a second frequency of the portion of the frequency range, and the first frequency and the second frequency are within a predetermined frequency range threshold.

2. The resonance inspection system of claim 1, wherein the instructions, when executed by the processor, further cause the processor to differentiate the first resonance spectra waveform such that the maximum slope point is characterized by a first peak at the first frequency, and determining the first resonance spectra waveform includes the maximum slope point at the first frequency includes determining the first resonance spectra waveform includes the first peak at the first frequency.

3. The resonance inspection system of claim 1, wherein the first resonance spectra waveform is a magnitude spectra part of the vibratory response signature and the second resonance spectra waveform is a phase spectra part of the vibratory response signature.

4. The resonance inspection system of claim 1, wherein the first resonance spectra waveform is a real spectra part of the vibratory response signature and the second resonance spectra waveform is an imaginary spectra part of the vibratory response signature.

5. The resonance inspection system of claim 1, wherein the absence of the structural mode is identified by determining and the first frequency and the second frequency are outside a predetermined frequency range threshold.

6. The resonance inspection system of claim 5, wherein the instructions, when executed by the processor, further cause the processor to:

identify a defect condition is present for the component by identifying the absence of the structural mode within a frequency range corresponding to a known structural mode of a model component.

7. The resonance inspection system of claim 1, wherein the instructions, when executed by the processor, further cause the processor to detrend the first resonance spectra waveform and the second resonance spectra waveform using one or both of a cepstral detrending technique or a polynomial detrending technique.

8. The resonance inspection system of claim 1, further comprising a probe assembly including a probe, the probe includes at least one piezoelectric transducer electrically connected with the control assembly, wherein the instructions, when executed by the processor, further cause the processor to:

control the at least one piezoelectric transducer to apply a vibration to the component; and measure the vibratory response signature of the component with the at least one piezoelectric transducer.

9. The resonance inspection system of claim 8, wherein the probe extends along a probe axis, the at least one piezoelectric transducer includes a sense piezo and a drive piezo, and the sense piezo and the drive piezo form a double-stacked piezo configuration of the at least one piezoelectric transducer with the sense piezo and the drive piezo disposed on the probe axis.

10. A method for identifying a presence or an absence of a structural mode of a component for an aircraft propulsion system with a resonance inspection system, the method comprising:

inserting a probe assembly of the resonance inspection system into the aircraft propulsion system to position a probe of the probe assembly contacting the component at a single point-of-contact, the probe includes at least one piezoelectric transducer including a sense piezo and a drive piezo;

controlling the drive piezo, with a control assembly of the resonance inspection system, to apply a vibration to the component;

measuring a vibratory response signature of the component with the sense piezo;

generating, with the control assembly, a plurality of different resonance spectra waveforms for a portion of a frequency range of the vibratory response signature, the plurality of different resonance spectra waveforms including a first resonance spectra waveform and a second resonance spectra waveform, and the first resonance spectra waveform is different than the second resonance spectra waveform;

detrending, with the control assembly, the first resonance spectra waveform and the second resonance spectra waveform; and identifying a presence or an absence of a structural mode of the component using the first resonance spectra waveform and the second resonance spectra waveform, the presence of the structural mode is identified by determining the first resonance spectra waveform includes a maximum slope point at a first frequency of the portion of the frequency range, the second resonance spectra waveform includes a second peak at a second frequency of the portion of the frequency range, and the first frequency and the second frequency are within a predetermined frequency range threshold.

11. The method of claim 10, wherein the steps of inserting the probe assembly into the aircraft propulsion system, controlling the drive piezo to apply a vibration to the component, and measuring the vibratory response signature of the component with the sense piezo are performed with the aircraft propulsion system installed on an aircraft.

12. The method of claim 10, wherein the component is a gas turbine engine rotor disk of the aircraft propulsion system.

13. The method of claim 10, wherein the first resonance spectra waveform is a magnitude spectra part of the vibratory response signature and the second resonance spectra waveform is a phase spectra part of the vibratory response signature.

14. The method of claim 10, wherein the first resonance spectra waveform is a real spectra part of the vibratory response signature and the second resonance spectra waveform is an imaginary spectra part of the vibratory response signature.

15. The method of claim 10, wherein the absence of the structural mode is identified by determining the first frequency and the second frequency are outside a predetermined frequency range threshold.

16. The method of claim 10, further comprising identifying, with the control assembly, a defect condition is present for the component by identifying the absence of the structural mode within a frequency range corresponding to a known structural mode of a model component.

17. The method of claim 10, further comprising identifying, with the control assembly, a defect condition is present for the component by identifying the absence one or both of the maximum slope point or the second peak within a frequency range corresponding to a known structural mode of a model component.

18. The method of claim 10, wherein the probe extends along a probe axis, and the sense piezo and the drive piezo form a double-stacked piezo configuration of the at least one piezoelectric transducer with the sense piezo and the drive piezo disposed on the probe axis.

19. The method of claim 10, wherein the probe further includes a tip member disposed at the sense piezo, and the tip member forms the single point-of-contact between the probe and the component.

20. The method of claim 10, further comprising differentiating the first resonance spectra waveform such that the maximum slope point is characterized by a first peak at the first frequency, and determining the first resonance spectra waveform includes the maximum slope point at the first frequency includes determining the first resonance spectra waveform includes the first peak at the first frequency.

* * * * *